SEQUENTIAL ACCESS DATA STORE

Original Filed June 30, 1960 6 Sheets-Sheet 1

INVENTORS:
Merton C. Leinberger
Cecil H. Burns
Robert A. Melnick
Louis A Kline
By John J. Matlago
Their Attorneys.

July 4, 1967 M. C. LEINBERGER ETAL 3,329,944

SEQUENTIAL ACCESS DATA STORE

Original Filed June 30, 1960 6 Sheets-Sheet 2

INVENTORS:
Merton C. Leinberger
Cecil H. Burns
Robert A. Melnick

By Louis A Kline
John J. Matlago
Their Attorneys.

SEQUENTIAL ACCESS DATA STORE

Original Filed June 30, 1960 6 Sheets-Sheet 3

INVENTORS:
Merton C. Leinberger
Cecil H. Burns
Robert A. Melnick
By Louis A. Kline
John J. Matlago
Their Attorneys.

SEQUENTIAL ACCESS DATA STORE

Original Filed June 30, 1960 6 Sheets-Sheet 4

INVENTORS:
Merton C. Leinberger
Cecil H. Burns
Robert A. Melnick
By Louis A. Kline
John J. Matlago
Their Attorneys.

INVENTORS:
Merton C. Leinberger
Cecil H. Burns
Robert A. Melnick
By Louis A. Kline
John J. Matlago
Their Attorneys.

INVENTORS:
Merton C. Leinberger
Cecil H. Burns
Robert A. Melnick
By Louis A. Kline
John J. Matlago
Their Attorneys.

United States Patent Office 3,329,944
Patented July 4, 1967

3,329,944
SEQUENTIAL ACCESS DATA STORE

Merton C. Leinberger, Inglewood, Cecil H. Burns, Palo Verdes, and Robert A. Melnick, Los Angeles, Calif., assignors to The National Cash Register Company, Dayton, Ohio, a corporation of Maryland Continuation of application Ser. No. 39,943, June 30, 1960. This application June 6, 1966, Ser. No. 555,942
10 Claims. (Cl. 340—174.1)

This application is a continuation of Application 39,943 filed June 30, 1960, and now abandoned.

The present invention relates to sequentially accessed cyclical data stores, and more particularly to the provision of apparatus for utilizing helical recording tracks on the surface of a rotating memory unit to provide an endless or continuous data storage channel.

It is highly desirable in data processing systems to provide sequentially accessed cyclical data stores having a large storage capacity. By use of such apparatus, stored coded data corresponding to a large number of business transactions can continuously and repeatedly be made available for simple manipulation, as the data serially read from the store is passed into a computing network, for example. Although a circumferential storage channel on a rotating drum with a single stationary transducer cooperating therewith has in the past been made available for such purposes, as the required capacity of the storage channel increases, an increase in the diameter of the drum is required. Such an approach thus becomes impractical when a continuous large capacity storage channel is required equivalent to many times the capacity of a channel provided by a single revolution of the drum.

In the preferred embodiment of the invention, a movable record member, in the form of a drum, having a plurality of annular sections capable of storing bits of binanry data, is rotated to pass each annular section through a respective operating zone extending across the respective section. A plurality of transducers are supported for transverse movement in respective operating zones to cooperate with respective annular sections for reading and recording data in said sections. The movement of the transducers is produced and controlled by operating means individually coupled to each transducer, for producing individual cyclical movements of the transducers in respective operating zones in which the cyclical movements have a predetermined out of phase relationship whereby the annular sections are alternately traversed by the transducers along respective helical data storage tracks.

In the preferred arrangement, the helical tracks in the respective sections are traced by the respective transducers while the transducers are in the forward travel portion of their individual cycles and traveling at a uniform rate in order to follow or trace uniform helical paths in the respective sections. In order to provide sequential operation of the transducers without interruption, the cycles of motion of the transducers have a predetermined out-of-phase relationship whereby the forward travel portions of the cycles of motion for the transducers are successive and preferably overlapping to assure a continuous channel for the storage of data. During the intervals of overlap of the forward travel of the transducers when either transducer is approaching the end of its forward travel and the other transducer is just beginning its forward travel and both are moving at a uniform rate, the connections of the read-write circuitry are switched from the transducer approaching the end of its forward travel to the transducer beginning its forward travel. The rotation of the drum and the movement of the transducers is coordinated and timing signals, indicating the positions of the transducers and the start of each cycle of the drum are coupled to signal circuits connected to the transducers to synchronize the switching from one transducer to the other when either transducer reaches the end of its respective data storage track and the other transducer reaches the beginning of its respective data track.

Accordingly, one of the objects of this invention is to provide a highly compact, large capacity sequentially accessed data storage channel on a rotating storage unit whose capacity is equal to the length of the path provided by a plurality of revolutions of the storage unit.

Another object of the invention is to provide a continuous data store by utilizing a plurality of helical recording paths provided on the surface of a rotating memory.

Another object of the present invention is to provide for moving a plurality of transducers across the surface of a rotating storage unit so as to provide helical recording paths and for switching the operation of the transducers to effectively connect the ends of the helical recording paths to form an endless or continuous storage channel.

Still another object of the invention is to provide for simultaneously reading and writing data on an endless data storage channel formed along helical recording paths provided on the surface of a rotating drum memory.

A still further object is to provide for synchronizing the switching of the operation of respective read and write heads in a plurality of transducers tracing respective helical data storage tracks on a rotating memory to thereby provide for simultaneously reading and writing data on a continuous data storage channel.

A still further object of the invention is to form a continuous data storage channel on the surface of a rotating drum by providing a pair of cyclically moving transducers each following a respective helical recording track on the rotating surface, which track is retraced on successive phases of the respective transducers along the rotating surface.

Other objects and features of the invention will become apparent to those skilled in the art as the disclosure is made in the following detailed description of a preferred embodiment of the invention as illustrated in the accompanying sheets of drawings in which:

FIG. 1 is a schematic illustration, partly in block diagram, of the preferred embodiment of the invention;

FIG. 2*a* illustrates a data storage drum of the preferred embodiment schematically, in which the longitudinal dimension of the drum has been exaggerated and portions have been broken away to permit the data tracks to be indicated schematically on the outer annular periphery of the drum;

FIG. 2*b* is a timing diagram of the movements of the transducers;

Figure 1:
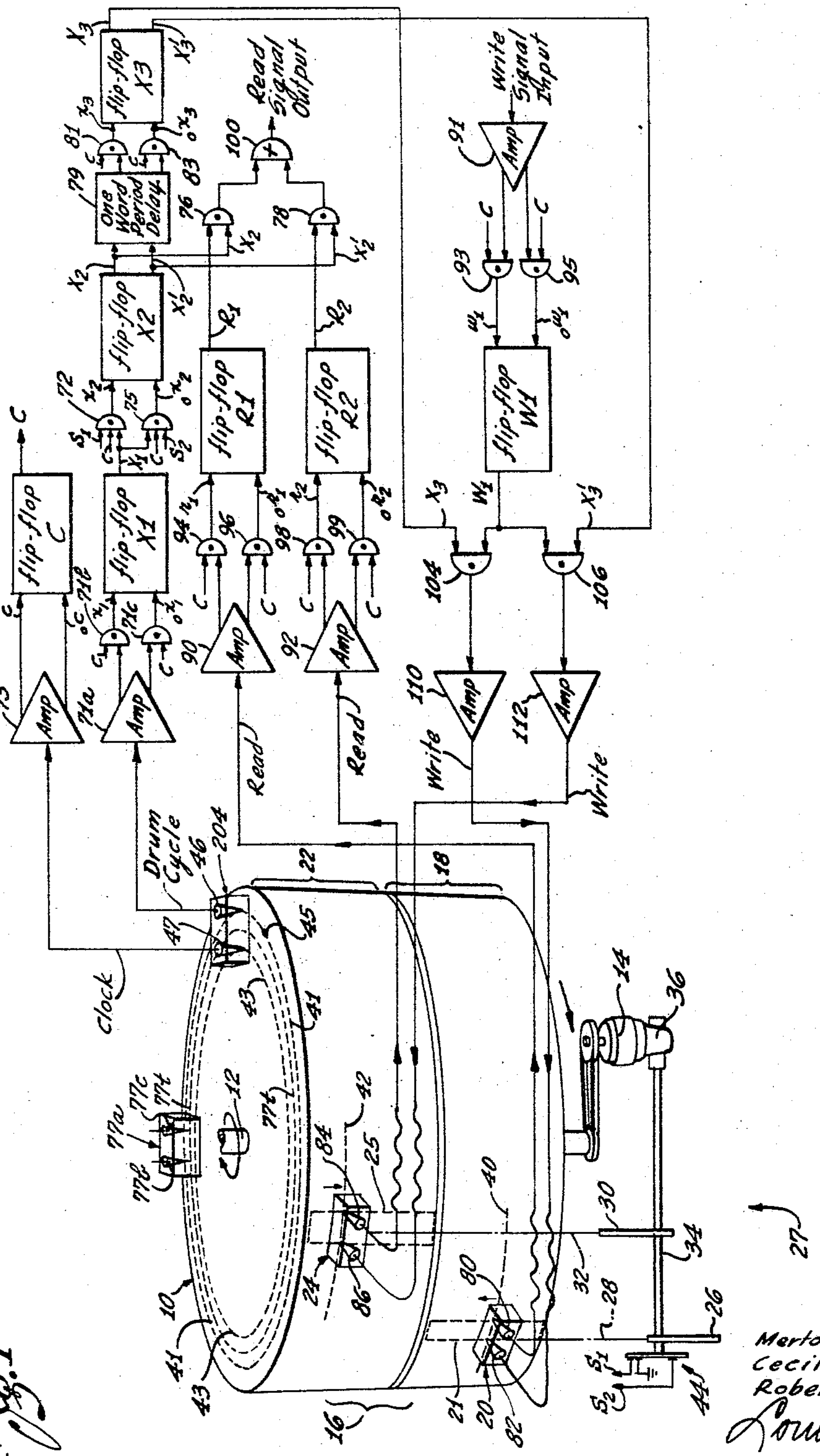

Referring to FIG. 1, in which the preferred embodiment for providing a continuous data storage channel in a sequential access data store has been illustrated schematically, a rotatable data storage drum 10 is shown mounted coaxially on a vertical drive shaft 12. The outer annular periphery 16 of the drum 10 includes lower and upper annular sections 18 and 22 which are capable of storing bits of binary data. A motor 14 is the primary source of driving power and is coupled to the shaft 12 for rotating the drum 10 about its axis.

During rotation of the drum 10, the lower and upper annular sections 18 and 22 thereof pass through operating zones 21 and 25 respectively. Zones 21 and 25 define areas adjacent the annular periphery of the drum which cooperate with tranducers 20 and 24 respectively, in order to record and read magnetically stored data in the annular sections 18 and 22. Transducers 20 and 24 are disposed adjacent the annular periphery 16 and supported for movement in a direction which is transverse to the direction of rotational movement of the annular sections 18 and 22, whereby rectilinear movement of the transducers 20 and 24, during their upward travel only, traverses respective annular sections 18 and 22 of the rotating drum along helical tracks 40 and 42 respectively, as shown in FIG. 2*a*.

The movable transducers 20 and 24 are coupled to an operating mechanism 27 which produces phased cyclical rectilinear movements of the transducers for traversing the respective annular sections 18 and 22 in respective transverse operating zones 21 and 25. The operating mechanism 27 comprises, in addition to other apparatus, a pair of disc cams 26 and 30 having identical profiles but disposed 180° out of phase. The disc cams 26 and 30 are coupled to respective transducers 20 and 24 by cam follower means, which in FIG. 1 is indicated by the schematically depicted cam follower rods 28 and 32, respectively. The cams 26 and 30 are mounted on a cam shaft 34 coupled to the motor 14 by a reduction gear train 36 to rotate the cam shaft at a reduced speed which is coordinated with the speed of rotation of the drum 10 in order to retrace helical paths on the respective annular sections 18 and 22 in successive upward movements or forward traversals of the sections by the respective movable transducers 20 and 24.

Figure 2A:
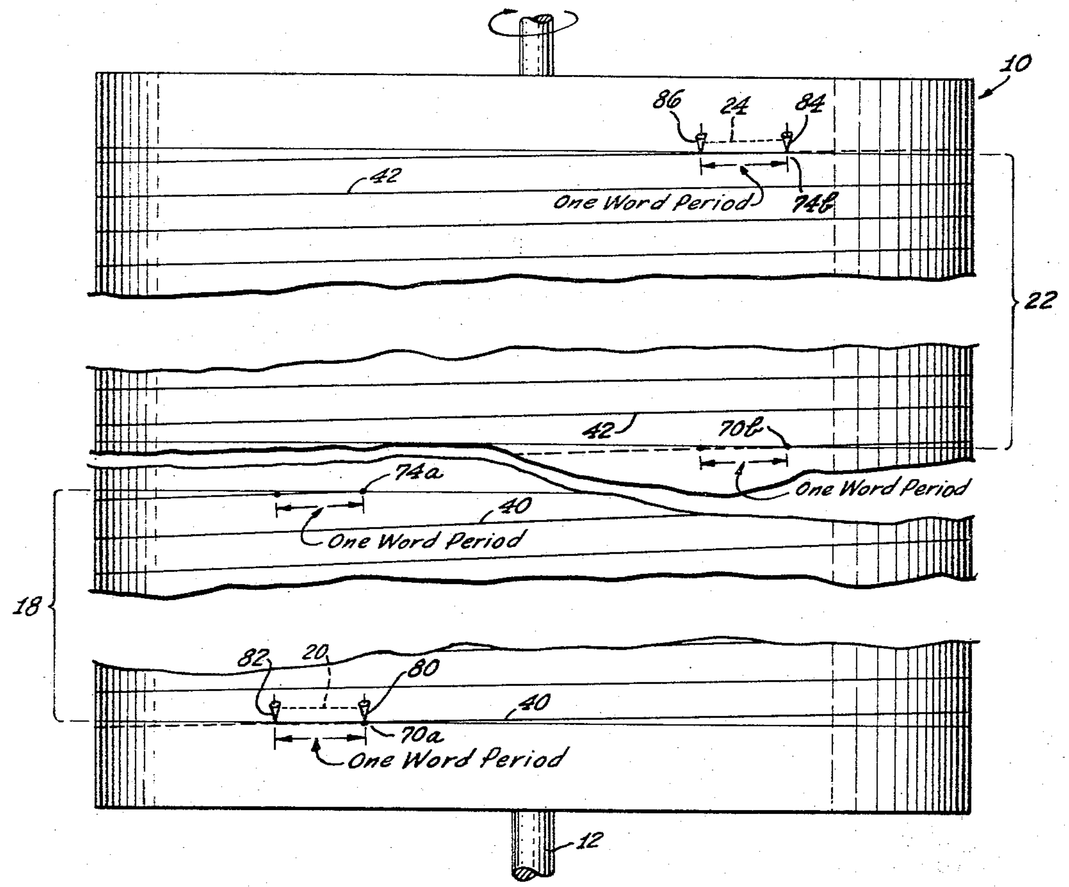
Figure 2B:
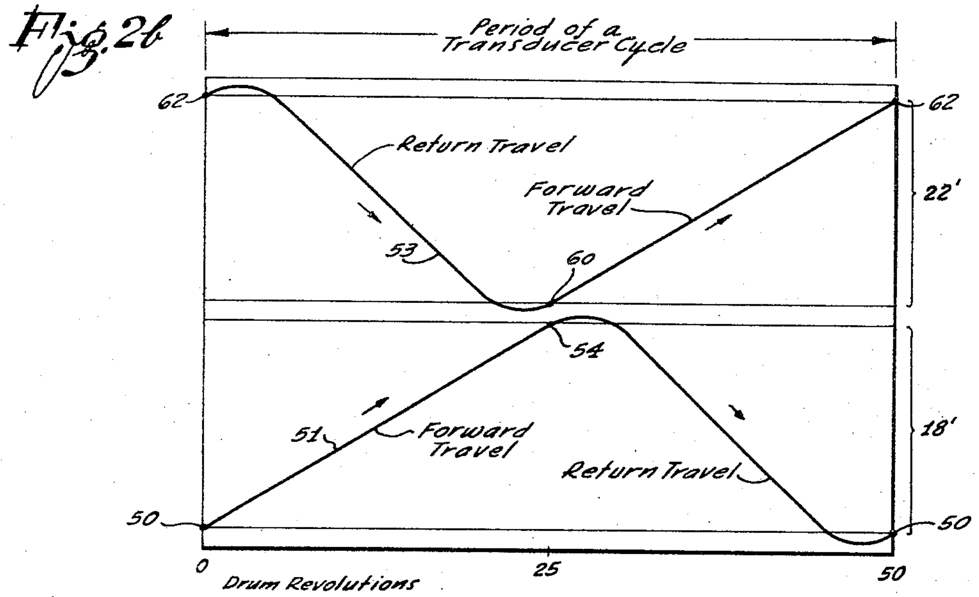

Phased cyclical movements of the transducers 20 and 24, by the operating mechanism 27 in respective operating zones 21 and 25, is depicted by the curves 51 and 53 in the timing diagram of FIG. 2*b* in which the individual but coordinated cylical movements of the movable transducers in respective operating zones are indicated separately on the vertical axis of the diagram while the number of revolutions of the drum 10 is indicated on a common horizontal axis. Areas 18' and 22' correspond to lower and upper sections 18 and 22, respectively of the drum 10. As shown, the cycles of motion of the transducers are identical, but shifted in phase substantially 180°. The rate of the return travel of the transducers 20 and 24 is at a faster rate than the rate of forward travel. The accelerated return travel provides a time period in which the returning transducer can be placed in motion at a uniform rate in the forward travel portion of its cycle, before the other transducer has completed its forward travel at the same uniform rate. During the time period that both transducers 20 and 24 are in the forward travel portion of their respective cycles, and both are moving at the same uniform rate, the read-write circuitry (FIG. 1) is switched from the transducer ending its forward travel to the transducer beginning its forward travel to provide for an uninterrupted flow of read signals to a common read signal output and write signals from a common write signal input to the transducers. Thus, a returning transducer is positioned at the lower edge of the respective annular section of the drum 10 for forward travel near the end of the forward travel of the other transducer to provide continuity between forward traversals of the respective annular sections at a uniform velocity. In this manner, adequate provision has been made to assure that no time lapse occurs between forward traversals of annular sections 18 and 22 by properly phased cylical movements of the transducers 20 and 24, and the apparatus for the continuous data storage channel is provided for recording or reading information on the outer periphery of the drum 10.

Coordination of the movements of the operating mechanism 27, and consequently, the movements of the movable transducers 20 and 24 with the rotational movement of the drum 10, results in tracing and retracing the same helical paths or tracks 40 and 42, illustrated in FIG. 2*a*, by the respective transducers 20 and 24 which alternately, without interruption traverse their respective sections while in the forward travel portion of their cycle of motion. Synchronized switching of the outputs of the transducers effectively joins the physically discontinuous tracks to provide a continuous channel for storing data and providing access thereto. A more detailed discussion of both FIGS. 2*a* and 2*b* will be made infra in the description of the switching arrangement and the specific apparatus employed in the preferred embodiment illustrated in FIGS. 5 to 7.

In the foregoing discussion, the mechanical arrangement, i.e. the operating mechanism 27, has been set forth generally for producing phased cyclical movement of a pair of movable transducers 20 and 24 for successively tracing helical tracks 40 and 42 (FIG. 2*a*) on respective annular sections 18 and 22 of the outer annular periphery of the drum 10 by coordinating the rectilinear movements of the transducers with the rotational movement of the drum. Switching means, including logical circuitry shown in block form in FIG. 1, is synchronized to be actuated with the movement of the operating mechanism 27 or movement of the transducers 20 and 24 and the drum 10 for switching from one transducer, near the end of its forward travel, to the other transducer, beginning its forward travel, to provide an endless or continuous channel in a sequential access data store.

Timing signals i.e., clock and drum cycle signals, for switching and for synchronization of information in the data store and in other circuitry are provided by special tracks on the drum 10 which contain permanently recorded timing signals. These signals are recorded in circular tracks 41 and 43 provided on the upper end-surface of the drum 10. In circular track 41, a signal discrete drum cycle marker signal 45 is magnetically recorded to indicate the beginning of a cycle of resolution of the drum 10. Circular track 43 has a closed series of timing signals, e.g., magnetically recorded signals having a sinusoidal waveform to provide a continuous source of clock pulses C. Stationary read head 46 and 47 are disposed adjacent to respective tracks 41 and 43 to detect the timing signals recorded in respective channels. The series of timing signals recorded in track 43 and detected by read head 47 are amplified by amplifier 73 to produce triggering signals $c$ and $_0c$ which are coupled to the true and false inputs of the flip-flop C having a true output providing a source of clock pulses C whose waveform is illustrated in FIG. 3*a*. The signal output of read head 46, illustrated in FIG. 3*b*, is coupled to amplifier 71*a* to provide input signals, FIGS. 3*c* and 3*d*, to "and" gates 71*b* and 71*c*, respectively, which produce triggering signals $x_1$ and $_0x_1$. The triggering signals $x_1$ and $_0x_1$ are coupled to the true and false inputs of flip-flop X1. A true output of flip-flop X1 provides a source of drum cycle marker pulses $X_1$, illustrated in FIG. 3*e*.

In FIG. 4*a*, drum marker pulses $X_1$ are shown in a scale smaller than shown in FIG. 3*e*. Additional timing signals, illustrated in FIG. 4*b* and 4*c*, are produced by a commutator 44 disposed coaxially on the cam shaft 34 to provide communtator signals $S_1$ and $S_2$ for synchronizing the switching of the output of the read heads and input to the write heads, in read and write signal paths, with the movement of the transducers 20 and 24. Preferably, the leading edge of the communtator timing signals $S_1$ or $S_2$ occurs midway between predetermined pairs of successive cycle marker pulses $X_1$ to ensure coincidence of one or the other of the occurring signals $S_1$ or $S_2$ and the latter drum cycle marker pulse $X_1$ of a pair.

The leading edges of the commutator signals $S_1$ supplied by the commutator 44, are positioned in time to occur one-half cycle before the transducer 24 reaches the end of its forward travel traversing the annular section 22, indicated by point 62 on the curve 53, in FIG. 2*b*; and one-half cycle before the beginning of the forward travel of the transducer 20 traversing the annular section 18, indicated by the point 50 on curve 51. Generally, as may be noted in the timing diagram of FIG. 2*b*, the phasing of the cycles of movements of the transducers 20 and 24, by adjustment of the angular positions of the disc cams 26 and 30, respectively, provides for one of the transducers 20 or 24 to begin its forward traversal of its respective section while the other is ending its forward traversal. For similar reasons, the leading edges of the commutator timing signals $S_2$ occur just prior to the end of the forward travel of transverse 20 over the annular section 18, indicated by point 54 on the curve 51, and the beginning of the forward travel of the transducer 24 over the annular section 22, indicated by point 60 on the curve 53.

The helical tracks 40 and 42, illustrated in FIG. 2*a*, are traced on the outer periphery of the drum 10 during the forward travel, at a uniform rate, of the transducers 20 and 24, respectively. The helical tracks 40 and 42 begin at precisely located points **70*a* and 70*b* respectively, and end at precisely located points 74*a* and 74*b*, respectively, which points are synchronized with the cycles of the drum 10 and the clock C. Since the cycle marker pulse $X_1$ indicates the beginning of each new cycle of the drum 10**, the coincidence of the commutator timing signal $S_1$, a drum cycle marker pulse $X_1$, FIGS. 4*b* and 4*a*, and a clock pulse C in gate 72 will provide a triggering signal $x_2$, FIG. 4*d*, at the true input of flip-flop X2 to produce the read switching signal $X_2$, FIG. 4*e*, required to switch the common read signal output from the read head 84 positioned at the end of the helical track 42, to the read head 80 positioned at the beginning of the helical track 40. Coincidence of the commutator timing signal $S_2$, FIG. 4*c*, a cycle marker pulse $X_1$ and a clock pulse C in gate 75 will provide the triggering signal ${}_0x_2$, FIG. 4*d*, to produce the read switching signal $X_2'$, FIG. 4*f*, required to switch the read signal output from read head 80 positioned at the end of the helical track 40, to the read head 84 positioned at the beginning of the helical track 42.

Figures 3, 4:
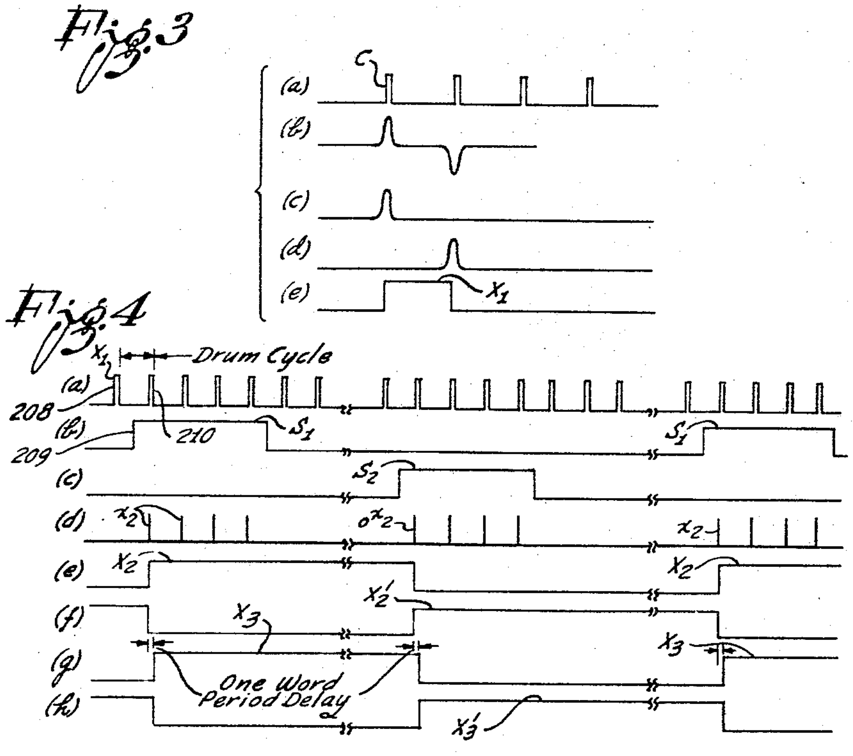
FIGS. 3 and 4 are idealized waveforms of typical signals produced in the operation of the invention.

Referring again to FIG. 1, for a description of the circuit arrangement for producing timing signals, illustrated in FIGS. 3 and 4, for switching the common read signal output and the common write signal input for switching from one movable transducer to another, the amplifier **71*a* is coupled to the stationary read head 46** for amplifying the cycle marker signal, FIG. 3*b*, detected by the read head 46 at the beginning of each cycle of revolution of the drum 10. The cycle marker signal 45, recorded on the drum 10 along track 41, may comprise a substantially square magnetic saturation pattern or other magnetic pattern which induces signals of opposite polarity and spaced the width of the recorded cycle marker signal 45 in the transducer 46 and which signals when amplified in the amplifier 71 including a suitable output transformer will provide signals, illustrated in FIGS. 3*c* and 3*d* which are coupled to "and" gates **71*b* and 71*c*. Coincidence of the inputs to gates 71*b* and 71*c* with the clock pulses C produces the triggering signals $x_1$ and ${}_0x_1$ which are coupled to true and false inputs, respectively, of the flip-flop X1. The true output of the flip-flop X1** provides drum cycle marker pulses $X_1$, illustrated by typical waveforms in FIGS. 3*e* and 4*a*, which are coupled to both "and" gates 72 and 75. Coincident signals, including a clock pulse C, coupled to either gate 72 or gate 75 produce triggering signals $x_2$ or ${}_0x_2$ respectively, illustrated in FIG. 4*d*, at the respective true and false inputs of the flip-flop X2 to place the flip-flop X2 in its true and false states, respectively. The first triggering signal $x_2$ or ${}_0x_2$ of a series, during a single commutator timing signal $S_1$ or $S_2$, illustrated in FIG. 4*d*, is adequate to change the state of the flip-flop X2; and subsequent triggering signals, occurring within the same commutator signal period of $S_1$ or $S_2$, are ineffective. The time period of a commutator signal $S_1$ or $S_2$ need not be longer than one cycle of the drum in order to assure coincidence of the cycle marker pulse $X_1$ and the commutator signals, $S_1$ or $S_2$. However, since the additional time of the period, i.e., three cycles of the drum, does not produce adverse effects in the operation, and the construction of the commutator is facilitated, the time period of the signals $S_1$ and $S_2$ is equal to approximately four cycles of the drum 10.

The read switching signals $X_2$ and $X_2'$ on the true and false outputs of flip-flop X2, illustrated in FIGS. 4*e* and 4*f*, are coupled to "and" gates 76 and 78 for sequentially switching the common read signal output of the memory from one read head to the other. The true and false outputs of flip-flop X2 are also coupled to the delay circuit 79 and to gates 81 and 83, respectively, to provide, upon coincidence with clock pulses C, true and false triggering signals $x_3$ and ${}_0x_3$ for the true and false inputs, respectively, of the flip-flop X3. The write switching signals $X_3$ and $X_3'$, from the true and false outputs of flip-flop X3, are coupled to respective gates 104 and 106 for sequentially switching the write signals $W_1$ from one write head to the other, one word period after switching of the common read signal output. In the preferred arrangement, the lateral separation of the heads is, for illustrative purposes, stated to be one word space; and, therefore, the delay in switching of the common write input including the delay of flip-flop $X_3$ is one word period.

Figure 5:
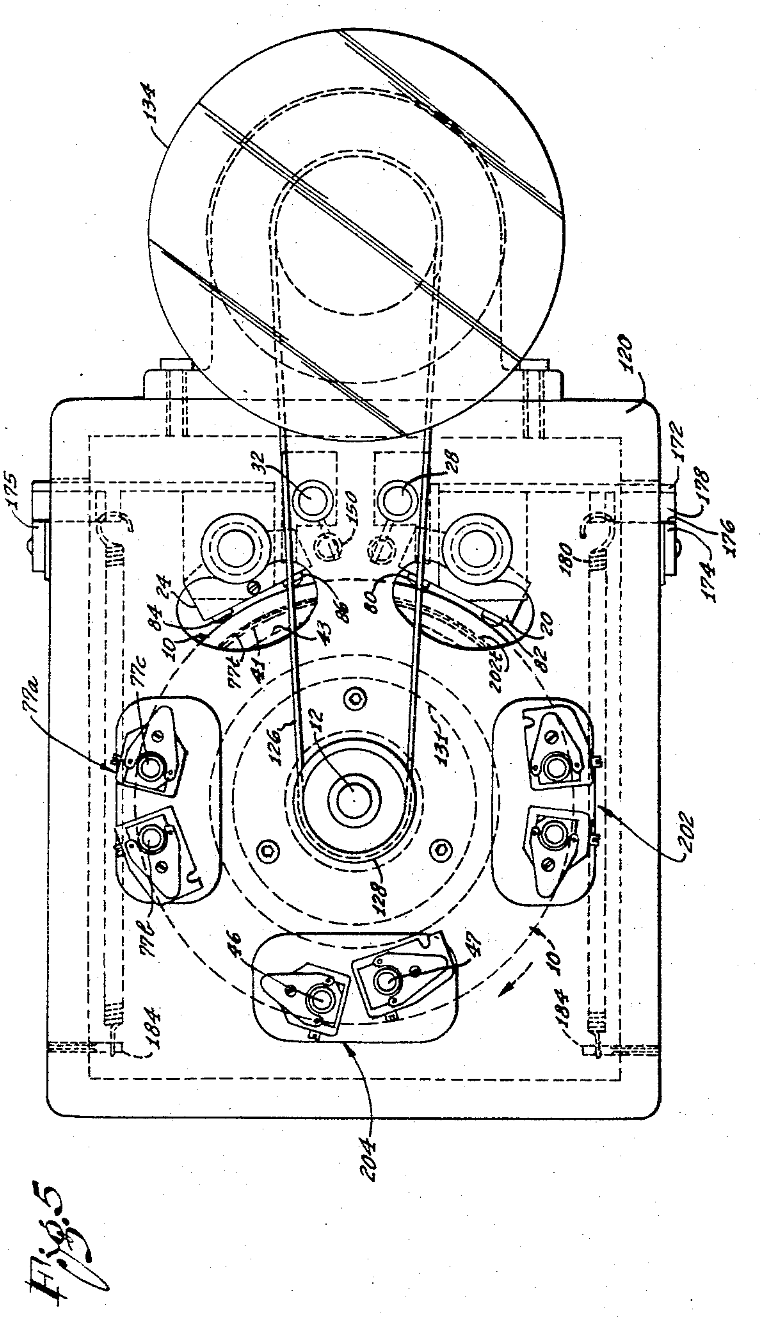
FIG. 5 is a top view of the apparatus included in the preferred embodiment of the invention.
Figure 6:
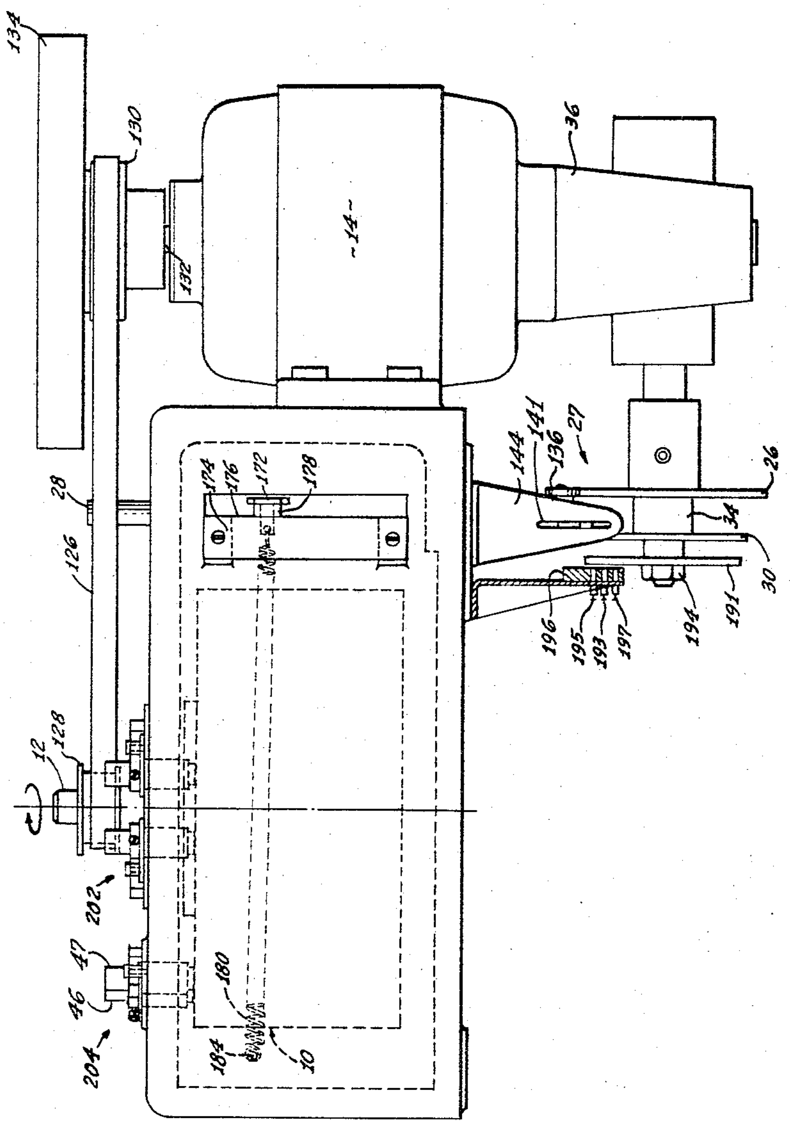
FIG. 6 is a side view of the apparatus shown in FIG. 5.

The delay circuit 79 may comprise recirculating line apparatus including write and read heads, for example, a stationary transducer **77*a*, shown in FIGS. 5 and 6, including a write head 77*b* and a read head 77*c*, which are disposed adjacent the upper end of the drum 10 above a portion of a circular track 77*t*. If the stationary transducer 77*a* is used for delay, the read and write heads 77*b* and 77*c*** are spaced to delay the true and false outputs of flip-flop X2 to effect a delay of one word period in changing the state of flip-flop X3 after a change in the state of flip-flop X2.

Figure 7:
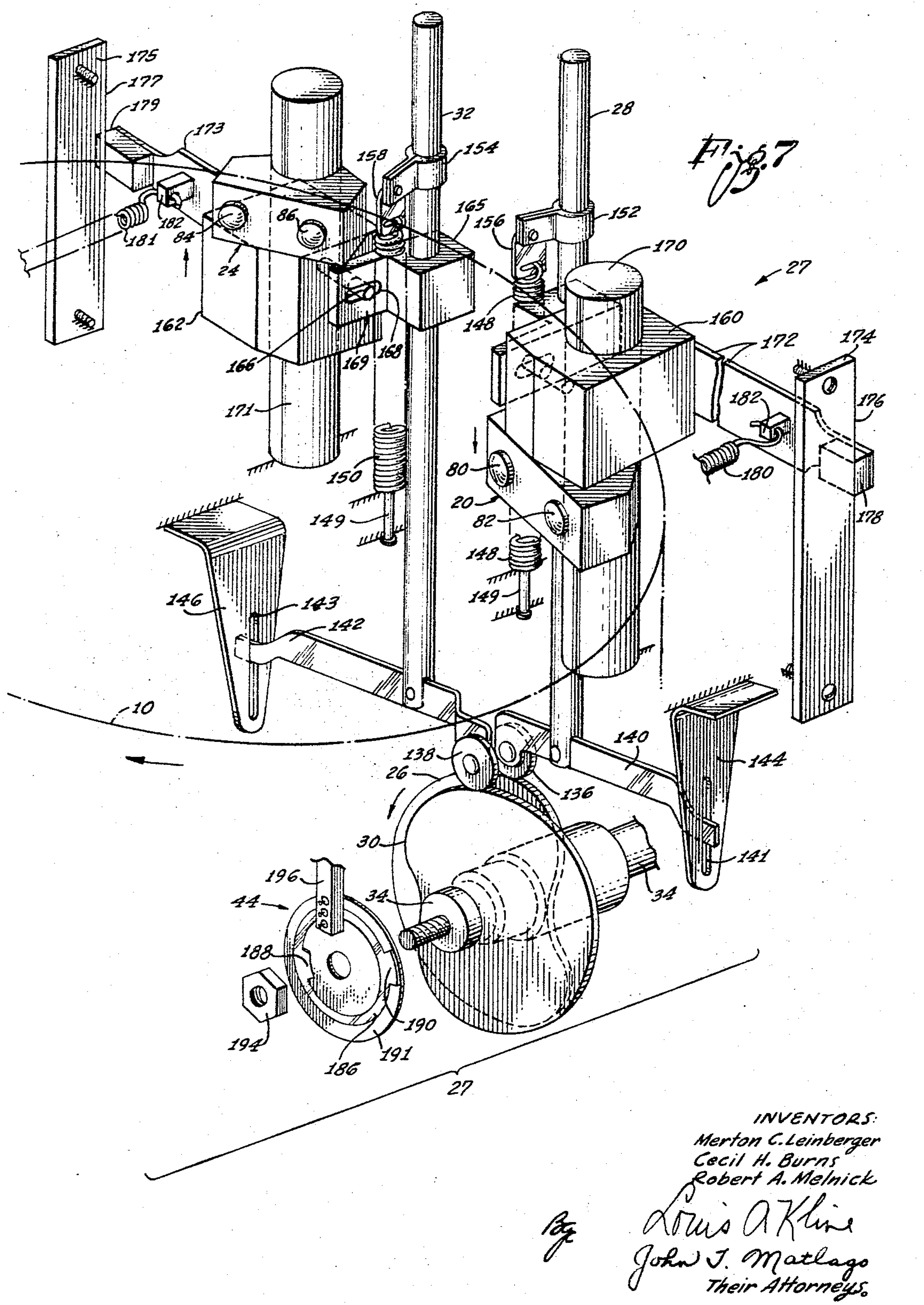
FIG. 7 is a perspective view of the transducer and operating mechanism of the preferred embodiment of the invention.

The need for the delay in switching of the common write input from one write signal path to the other in order to couple the write signals W to the proper transducer write head will be apparent upon examination of the helical tracks 40 and 42, illustrated in FIG. 2*a*, and upon noting the lateral spacing of the heads in the detailed construction of the transducers 20 and 24, illustrated schematically in FIG. 1, and shown in detail in FIGS. 5 and 7. The movable transducer 20 includes the read head 80 and the write head 82. The heads 80 and 82 are spaced circumferentially about the periphery of the drum 10 at a predetermined distance of one word space. The spacing of read head 84 and the write head 86 in transducer 24 is the same as the spacing of the read and write heads in the transducer 20. Individual read and write heads in a single movable transducer permit reading and writing simultaneously, while positioning of the read head before the write head along a helical track 40 or 42 provides advance examination of a data track for locating available spaces for writing by the write head spaced one word period behind the read head.

Referring now more particularly to FIG. 2*a* and 2*b*, the transducers 20 and 24 have been indicated schematically in the drawings to clarify the switching operation and the need for the delay in the switching of common write signal input to the write heads 82 and 86. The movable transducers 20 and 24 are indicated in FIG. 2*a* to be in positions in this case corresponding to the positions indicated by points 50 and 62, shown on the timing diagram in FIG. 2*b*. When the transducers 20 and 24 are located in the positions indicated in FIG. 2*a*, the read head 80 in transducer 20 is positioned at the beginning of the helical track 40 and the read head 84 in transducer 24 is positioned at the end of the helical track 42. The switching of the common read signal output, from read head 84 to read head 80, discontinues the passing of data signals to the read signal output from the read head 84, and starts the passing of data signals to the read signal output from the read head 80.

It should be noted that at the time of switching of the read signal output, the write head 86, when located as indicated in FIG. 2*a*, is positioned one word space from point 74*b*, the end of the helical track 42; and the write head 82 is positioned one word space from point 70*a*, the beginning of the helical track 40. Under these conditions, as shown, the switching of the write signals $W_1$ to the write head 82 should be delayed one word period at which time the write head 82 will reach point 70*a*; and concurrently, write head 86 will reach point 74*b*. As noted previously, the spacing between read and write heads in transducers 20 and 24 respectively is identical, and therefore, the time period of delay of switching is the same. In the preferred arrangement, the read and write heads of the transducers are spaced one word period, and therefore, the time period of delay in switching of the write heads, after switching of read heads, is one word period. This need for delaying will be made more apparent upon considering the possibility of switching the read and write heads of transducers 20 and 24, simultaneously. This does not occur in the present arrangement but for purpose of explanation it is being considered. Simultaneous switching according to the hypothesis, would result in reading in the word space between the write and read heads at the end of the helical tracks 40 and 42 (FIG. 2*a*), in which word space no data has been written since the write heads have been switched prior to passing over this word space; and, furthermore, such operation would result in writing in the word space between the read and write heads at the beginning of the helical tracks 40 and 42, in which word space the data written could not be read since the read heads are not switched until after passing over this space. For example, the word space between write head 86 and read head 84, as illustrated in FIG. 2*a*, would not contain data since write head 86 would be switched prior to passing over this word space; whereas read head 84 would read this word space when it should be reading the data in the word space between write head 82 and read head 80. As a result, the data written in the word space between write head 82 and read head 80 is never read and the data storage channel is interrupted by one word space in addition to losing the data in the word space. The same analogy is applied to the word space at the end of track 40 and the beginning of track 42.

The signal output of the read heads in transducers 20 and 24 are coupled to a common output through individual read signal paths, and the write heads are coupled to a common input source of write signals through individual write signal paths. The data signals detected by the read heads 80 and 84 are amplified by amplifiers 90 and 92 respectively, individual to each read signal path. The amplified data signals in the output of the amplifier 90 are coupled to "and" gates 94 and 96 wherein the amplified data signal inputs are individually gated by the separate clock pulse inputs C. The data signals passed by "and" gates 94 and 96 provide triggering signals $r_1$ and ${}_0r_1$ respectively for triggering the flip-flop R1. The output pulses $R_1$ from the true output of flip-flop R1 are coupled to the "and" gate 76 which passes read signals $R_1$ when enabled by a read switching signal $X_2$, illustrated in FIG. 4*e*, as provided on the true output of the flip-flop X2.

The amplified data signal output of the amplifier 92 is coupled to "and" gates 98 and 99, having clock pulse inputs C for producing triggering signals $r_2$ and ${}_0r_2$ respectively at the true and false inputs of the flip-flop R2. The output pulses $R_2$ from the true output of the flip-flop R2 are coupled to the "and" gate 78. The read switching pulses $X_2'$, illustrated in FIG. 4*f*, enable the "and" gate 78 to pass the data signals from the true output $R_2$. The successive, alternate outputs of the gates 76 and 78 are coupled to an "or" gate 100 to provide a single output from the individual paths for read signals from respective read heads 80 and 84.

The individual write signal paths are provided for alternately coupling write signals $W_1$ to the write heads 82 and 86 in the movable transducers 20 and 24, respectively. The write signal input coupled to an amplifier 91 is amplified and coupled to gates 93 and 95 having clock pulse inputs to provide triggering signals $w_1$ and ${}_0w_1$ for producing write signals $W_1$ at the true output of the flip-flop W1.

Referring to FIGS. 5 to 7 for a detailed description of the mechanical arrangement of the preferred embodiment, a casing 120 as shown in FIGS. 5 and 6 provides a partial enclosure for a major portion of the assembly, a mounting for motor 14, and supporting structure for the drum 10, operating means 27, and the movable transducers 20 and 24. The drum 10 is coupled to the motor 14 by a belt drive which rotates the drum at twice the speed of the motor 14. The belt drive includes a belt 126, a pulley 128 secured to the upper end of the drive shaft 12 and a pulley 130 secured to the motor drive shaft 132. The drive shaft 12 is supported for rotation in the casing 120 by upper and lower radial bearings, contained by a bearing housing 131, supporting the drive shaft 12 for rotation about the shaft axis. A flywheel 134 is mounted on the upper end of the motor drive shaft adjacent to the pulley 130 for regulating the speed of the drum 10 and the motor 14.

The operating mechanism 27 (FIGS. 6 and 7) for the movable transducers 20 and 24 is coupled to the motor 14 by a worm gear drive speed reduction unit 36 coupled to the camshaft 34. The disc cams 26 and 30 are mounted for rotation on camshaft 34 to actuate the cam follower assembly by engaging the rollers 136 and 138, respectively.

Referring now more particularly to FIG. 7 in which the operating mechanism 27 is illustrated and the profiles of the disc cams 26 and 30 are visible, the individual cams 26 and 30 are mounted on the shaft 34 substantially 180° out of phase to impart the required motions to the follower assemblies, whereby rotation of the cams produces predetermined cyclical rectilinear motions to the cam followers and transducers 20 and 24. The individual rectilinear motions of the cam follower assemblies and transducers are illustrated in the timing diagram of FIG. 2*b*. Cam follower rollers 136 and 138, which are offset from the follower rods 28 and 32, are connected to the follower rods by guide arms 140 and 142, respectively. As shown, the arms 140 and 142 are secured to and project laterally past the rods 28 and 32, respectively, to pass through respective vertical guide slots 141 and 143 in brackets 144 and 146, respectively. The guide slots extend vertically the distance of travel of the follower arms 140 and 142 and parallel to the movement of the rods 28 and 32 to maintain the alignment of the cam rollers 136 and 138 with the respective cam discs 26 and 30; and, generally, to inhibit rotation of the cam follower assembly thereby maintaining the alignment of the cam rollers 136 and 138 with the cams 26 and 30 respectively.

In the transformation of motion of rotation of the disc cams 26 and 30 to rectilinear motion of the cam follower rods 28 and 32, respectively, the cam follower assemblies are lifted by direct contact of the rollers 136 and 138 and the respective cams. The upward vertical movement of the follower rods 28 and 32 or the transducers 20 and 24 is denoted in FIG. 2*b* as the forward travel; and the downward movement, as the return travel. A movable transducer which has completed its forward travel returns to its initial or extreme lower position to complete a cycle of a motion which is then repeated. The return force is applied to the cam rods 28 and 32 by coil springs 148 and 150, respectively. The lower ends of the coil springs 148 and 150 are fixed as, for example, by anchoring to the lower side of the casing by suitable fastening means 149. The upper portions of the springs 148 and 150 are secured to the respective rods by clamping brackets 152 and 154 which are secured to the ends of the springs by linkages 156 and 158, respectively.

The transducers 20 and 24 are secured to mounting blocks 160 and 162 by suitable fastening means to position the exposed heads adjacent the annular periphery 16 of the drum 10. The transducer mounting block 162 is connected to the follower rod 32 by a bracket 165 which is securely fitted on the rod 32, as shown, and coupled to the transducer mounting block 162 by a pin 166. The pin 166 is secured in the mounting block 162 to project laterally and pass through the transverse slot 168 provided in an arm 169 of the clamping bracket 165. Mounting block 160 is connected to rod 28 in the same manner as shown. These connections between the respective follower assemblies and the respective transducer mounting blocks transmit vertical motion of the followers to the respective transducers 20 and 24 and their respective mounting blocks without transmitting possible lateral motions of the rods 28 and 32, and allows for greater tolerances in the follower assembly guides and linkages permitting small movements laterally which do not affect the precise positioning of the transducer 24 along the outer annular periphery of the drum 10.

The transducers 20 and 24 and the mounting blocks 160 and 162 each have vertical, centrally disposed openings to permit these members to be slidably supported on respective vertical shafts 170 and 171, provided for guiding the vertical movements of the transducers 20 and 24, respectively. Rotational movement of the transducers 20 and 24, and their mounting blocks 160 and 162, is inhibited by laterally projecting guide arms 172 and 173 respectively, secured to the respective mounting blocks 160 and 162. The ends of the guide arms 172 and 173 are moved up and down along vertical edges 176 and 177, respectively, of guide plates 174 and 175 which are secured to the respective sides of the casing 120, as shown in FIGS. 5 to 7. Spacer blocks 178 and 179 secured to the end portions of the lateral guide arm 172 and 173, respectively, are spring urged to ride along the vertical edges of the respective guide plates 174 and 175 by the tension of coil springs 180 and 181, each of which has one end connected to the respective guide arm by a suitably apertured bracket 182. The opposite ends of the springs 180 and 181 are coupled to the sides of the casing 120, as shown in FIG. 5.

The arrangements of the respective movable support assemblies for the transducer 20 and 24, coupling the transducers to the respective cam follower rods and including the vertical guide arrangement to prevent rotation, are substantially the same; however, it should be noted that the transducer 20 is secured to the bottom of the mounting block 160 whereas transducer 24 is disposed on top of block 162, and the support assemblies are disposed on opposite sides of respective cam follower rods. Positioning of the transducers 20 and 24, as shown, enables them to traverse the respective lower and upper annular sections 18 and 22 upon the actuation of operating means 27.

The commutator 44, which provides the commutator timing signals $S_1$, $S_2$ for switching between movable transducers 20 and 24, is shown in the exploded view portion of FIG. 7. The commutator 44 includes a continuous circular conductive strip 186 and individual radially extending and integral commutating segments 188 and 190 secured concentrically on a circular disc 191. The disc 191 is locked in position on the threaded end of the shaft 34 for synchronous movement with the shaft 34 by a nut 194, as shown. The commutator strip 186 is connected to ground by a brush 193, illustrated in FIG. 6. Commutator signals $S_1$ and $S_2$ are generated at brushes 195 and 197 by the individual segments 188 and 190 engaging the brushes 195 and 197 during rotation of the disc 191. The brushes are supported by a block 196, and project therefrom to engage the circular strip 186 and respective contact segments.

Referring now more particularly to FIGS. 5 and 6, the stationary transducer **77*a* is shown to include a write head 77*b* and a read head 77*c* which are spaced to provide one word period between sequentially writing and then reading information on the portion of a track 77*t* between heads. The stationary transducer is employed for recirculating signals coupled to the write head 77*b* and taken off at the read head 77*c*. An identical stationary transducer 202 for recirculating signals is disposed on the opposite side of the drum 10 to cooperate with track 202*t*. A stationary transducer assembly 204 is provided for supporting read heads 46 and 47 for reading drum cycle and clock timing signals recorded along tracks 41 and 43**, respectively.

The operation will next be presented of the present invention, in which a continuous data store is provided by an arrangement in which a pair of transducers 20 and 24 are supported for transverse movement in respective operating zones 21 and 25 to cooperate with respective annular sections 18 and 22 of the outer annular periphery of the rotating drum 10. The traversals of the transducers 20 and 24 across sections 18 and 22, respectively, is indicated by the curves 51 and 53, respectively, in FIG. 2*b*. The transducers 20 and 24 alternately move upwardly traversing respective sections 18 and 22. This movement is indicated in FIG. 2*b* by the portions of the respective curves 51 and 53 between the points 50 and 54 and 60 and 62, respectively. During the period the transducer 20 traverses section 18 i.e., during the forward travel between points 50 and 54, the read signals coupled to "and" gate 76 from the read head 80 are coupled to the common read signal output through "or" gate 100; and during the period the transducer 24 traverses section 22, i.e., during the forward travel between points 60 and 62, the read signals from read head 84 are passed by gates 78 and 100 to the common read signal output.

The write heads 82 and 86 alternately record the write signals coupled into the input of the amplifier 91. Write signals on the output of amplifier 91 are gated by clock signals C in the "and" gates 93 and 95 to provide triggering signal inputs $w_1$ and ${}_0w_1$ to the flip-flop W1. The write signals $W_1$ provided on the output of the flip-flop W1 are coupled to both gates 104 and 106. During the period of the forward travel of the transducer 20, the write signals $W_1$ are passed by gate 104, amplified in amplifier 110, and coupled to the write head 82 which head records the write signals $W_1$ in the helical track about section 18; and, during the period of the forward travel of transducer 24, the write signals $W_1$ are passed by gate 106, amplified in amplifier 112, and coupled to the write head 86 which records the write signals $W_1$ in the helical track about section 22.

The commutator signals $S_1$ and $S_2$, FIGS. 4*b* and 4*c*, indicating the beginning of the forward travel of transducers 20 and 24, respectively, are derived from the commutator 44 which is disposed on the end of the camshaft 34 and is driven in synchronism with the disc cams 26 and 30. The commutator provides signals $S_1$ and $S_2$ indicative of predetermined radial sections of the disc cams 26 and 30 which correspond to predetermined rectilinear positions of the movable transducers. Thus, the commutator 44 is capable of providing commutator signals $S_1$ and $S_2$ at the beginning of the traversals of the annular section 18 and 22 by the transducers 20 and 24, respectively, by adjustment of the rotational position of the commutator disc 191 relative to the predetermined relative positions of the cams 26 and 30. The commutator disc is adjusted to produce signals $S_1$ and $S_2$ having leading edges occurring one-half a revolution of the drum before the beginning of the traversals of the sections 18 and 22 by the transducers 20 and 24, respectively. The beginning of the traversals of the annular sections 18 and 22 by the respective transducers 20 and 24 is indicated by the points 50 and 60, respectively, in the timing diagram in FIG. 2*b*.

As either transducer traverses its respective annular section 18 or 22, during the period of its forward travel, the read and write heads in the respective transducer trace a path on the section for storing data, and retrace the same path on subsequent traversals, e.g., the read and write heads 80 and 82 of transducer 20 trace a path along track 40 in annular section 18, as shown in FIG. 2*a*. The tracks 40 and 42 are helical and begin at precisely located points 70*a* and 70*b* which are positioned at the lower edges of annular sections 18 and 22, respectively. The precise location of the points 70*a* and 70*b* about the circumference of the drum is resolved in the timing circuitry by drum cycle marker signals derived from the drum cycle marker channel having a signal 45 magnetically recorded in the circular track 41. The recorded cycle marker signal indicates the beginning of a new cycle or revolution of the drum 10. The typical output of the read head 46, in response to the cycle marker signal recorded on the drum, is illustrated by the typical signal waveform as shown in FIG. 3*b*. The signal output of read head 46 is coupled to amplifier 71*a* providing enabling signals to gates 71*b* and 71*c*. The flip-flop X1 is controlled by triggering signals $x_1$ and $_0x_1$ provided by gates 71*b* and 71*c*, as discussed supra, to produce cycle marker pulses $X_1$, at the true output of flip-flop X1, illustrated in FIGS. 3*e* and 4*a*. Commutator signal $S_1$ enables gate 72 and signal $S_2$ enables gate 75 to provide triggering signals $x_2$ and $_0x_2$ upon coincidence of clock pulses C and cycle marker pulses $X_1$ at the respective gates as illustrated by the typical waveforms in FIGS. 4*a* to 4*d*. The triggering signals $x$ and $_0x_2$ coupled to the true and false inputs of flip-flop X2 produce switching signals $X_2$ and $X_2'$, FIGS. 4*e* and 4*f*, at its true and false outputs.

Commutator signals $S_1$ and $S_2$ are adjusted in time to begin approximately midway between predetermined pairs of cycle marker pulses $X_1$ to assure coincidence of a commutator signal $S_1$ or $S_2$ and the marker pulse $X_1$ immediately following the leading edge of the commutator signal. For example, as illustrated in FIGS. 4*a* and 4*b*, the leading edge 209 of the commutator signal $S_1$ occurs midway between cycle marker pulses 208 and 210. The true and false outputs of the flip-flop X2 provide alternately high potential switching signals $X_2$ and $X_2'$ for the read heads 80 and 84, respectively. The switching signals $X_2$ are coupled to gate 76 to pass the read signals from the read head 80 during forward travel of the transducer 20. The switching signals $X'_2$ are coupled to the gate 78 to pass the read signals from the read head 84 during the forward travel of the transducer 24.

Since the read and write heads in each movable transducer 20 and 24 are separated by one word space in the preferred arrangement, only the read heads 80 and 84 are positioned at the beginning of the respective tracks 40 and 42 when the respective switching signals $X_2$ and $X'_2$ initially rise to their high level; and the write heads 82 and 86 do not reach the beginning of the respective tracks until one word period later. Therefore, the switching signals $X_3$ and $X'_3$ for the write heads 82 and 86, respectively, are delayed one word period after switching the common read signal output to delay switching of the common write signal input until the write heads reach the beginning of the tracks 40 and 42 at points 70*a* and 70*b*, respectively. The true and false outputs of flip-flop $X_2$ are, therefore, coupled through the delay network 79 to be delayed one word period prior to coupling the outputs to respective gates 81 and 83. Clock pulses C coupled to gates 81 and 83 enable the gates to provide triggering signals $x_3$ and $_0x_3$ at the true and false inputs of flip-flop X3. The true and false outputs of flip-flop X3 provide write switching signals $X_3$ and $X'_3$ illustrated in FIGS. 4*g* and 4*h*, for the write heads 82 and 86 respectively, which are delayed one word period after read switching signals $X_2$ and $X'_2$, respectively. Alternately, the write switching signals $X_3$ and $X'_3$ are at a high potential. The write switching signal $X_3$ is coupled to "and" gate 104 to pass the write signals $W_1$ to amplifier 110 and write head 82 when the write head 82 reaches point 70*a* (FIG. 2*a*) at the beginning of the track 40; and the write switching signal $X'_3$ is coupled to the "and" gate 106 to pass the write signals $W_1$ to the amplifier 112 and the write head 86, when the write head 86 reaches the beginning of the track 42 at the point 70*b*.

The read switching signals $X_2$ and $X'_2$, illustrated in FIGS. 4*e* and 4*f*, are coupled to gates 76 and 78 respectively to alternately enable the gates 76 and 78 to pass the read signals $R_1$ and $R_2$, respectively, coupled thereto from respective read heads 80 and 84 through individual read signal paths. Since either the read switching signal $X_2$ or $X'_2$ is at a high potential, alternate paths through either "and" gates 76 or 78 will provide for a continuous flow of read signals from alternate read heads to the read signal output of "or" gate 100. The "and" gates 104 and 106 are alternately enabled by writing switching signals $X_3$ and $X'_3$, respectively, illustrated in FIGS. 4*g* and 4*h*, to provide alternate paths during predetermined time intervals of signals $X_3$ and $X'_3$ for a continuous flow of write signals $W_1$ to the alternate write heads 82 and 86.

Various modifications are contemplated and may obviously be resorted to by those skilled in the art without departing from the spirit and scope of the invention, as hereinafter defined by the appended claims, as only a preferred embodiment thereof has been disclosed. For example, the data storage tracks 40 and 42 (FIG. 3) can be interlaced wherein the tracks are interposed instead of being separated in individual sections 18 and 22. However, an operating mechanism 29 would be required which would drive each of the movable transducers 21 and 24 to traverse the entire width of the outer annular periphery 16 of the drum 10 instead of only the respective annular section 18 or 22. Also contemplated by the present system is the utilization of three or more movable transducers and three or more corresponding sections on three or more interlaced tracks. Additional modifications are numerous and often more obvious, e.g., a continuous record medium in the form of a tape or belt and substitution of any other transducing system for storing information having a record medium and a transducer for reading or writing information on the record medium.

What is claimed is:

1. In an arrangement for providing a continuous channel in a sequential access data store, the combination comprising: data storage means comprising a circular record member capable of storing data on an annular record surface thereof; transducing means including a plurality of transducers for cooperating with respective tangential sections of said record surface for reading and writing data, each of said transducers comprising a set of spaced read and write heads and individual mounting means therefore to maintain read and write heads of each transducer in fixed spaced relationship relative to one another; individually movable support means for each transducer disposed circumferentially about said record member for movement along circumferentially spaced paths, each of said movable support means being constructed and arranged to be moved rectilinearly transversely to said record surface along said circumferentially spaced paths to provide for overlapping transverse movement of said mounting means whereby said read and write heads of said plurality of transducers are capable of cooperating with the entire record surface of respective tangential sections of said record surface including tangential areas of said sections; operating means individually coupled to each of said support means and to said record member for producing relative movement of said record member and transducers to form distinct, substantially helical data tracks sequentially on the record surface during successive alternate traversals by said read and write heads in respective transducers cooperating with said record surface; and switching means coupled to said transducers for selecting the one transducer cooperating with its respective information track for reading and writing data continuously on alternate data tracks.

2. The combination according to claim 1 in which said operating means comprises disc cams individually coupled to respective ones of said support means for each transducer.

3. The combination according to claim 2 in which said individually movable support means comprises cam followers and guide means laterally spaced from said cam followers for maintaining the alignment of each of said cam followers on the periphery of said disc cams.

4. The combination according to claim 2 in which each of said disc cams have identically contoured periperal surfaces including sections of uniform contour disposed substantially 180° out-of-phase to impart uniform transverse movements to said support means alternately.

5. The combination according to claim 2 in which said operating means further includes a cam shaft for said disc cams and common drive means coupled to said cam shaft and said record member, and said switching means further includes commutation means comprising a commutator disc and brushes engaging said disc to produce two timing signals each cycle of revolution thereof to control the switching of respective ones of said transducers for cooperating with said record surface.

6. A sequential access data store for providing an endless data storage channel, said data store comprising: an annular rotatable record member having a record surface capable of storing data; transducing means including a pair of movable transducers, each including separate read and write heads disposed at a predetermined fixed distance relative to one another for cooperating with said record surface at a fixed distance along a single helical data track; individual support means circumferentially spaced about said record member for respective ones of said pair of transducers including means for providing for individual rectilinear movement of each transducer along respective circumferentially spaced paths having a direction transverse to the direction of rotation of said record member; operating means individually coupled to said support means for said transducers for cyclically and successively producing a uniform relative movement of alternate ones of said transducers along respective ones of said circumferentially spaced paths to cooperate with respective helical data tracks on said record surface and positioning the read head of one of the transducers at the beginning of its respective helical data track for reproducing data from said record surface when the read head of the other one of said transducers approaches the end of its respective data track; and cyclically operated switching means coupled to said pair of transducers for sequentially switching to the read head positioned at the beginning of its respective helical data track from the other read head positioned at the end of its respective data track to provide for a continuous, uninterrupted sequential flow of data through the transducers during uniform relative movement of one or the other of the read heads cooperating with said record surface along their respective data tracks.

7. The data store according to claim 6 in which each of said pair of transducers includes means for mounting said read and write heads of each transducer in a single enclosure and at a predetermined uniform word length spacing equal to a predetermined number of recorded binary signals in order to read and record binary signals of successive words simultaneously on said helical data tracks.

8. The data store according to claim 7 wherein said switching means is constructed and arranged to alternately switch both outputs and inputs of said read and write heads of the transducers to individually read and record on the record surface along respective data tracks during uniform movement of the read and write heads along respective data tracks.

9. The data store according to claim 8 in which said switching means includes means for delaying the switching of the inputs to the write heads after switching the outputs of the read heads for a time interval equal to the time period required for the record member to move the distance between the read and write heads of the respective transducers.

10. The data store according to claim 8 in which said switching means includes commutator means coupled to said operating means for producing first and second timing signals, each having a time duration of at least one cycle of revolution of said annular record member and occurring at the end of each uniform relative movement of respective ones of said transducers; cycle timing means coupled to said record member and producing a cycle pulse each revolution of said record member, each having a time duration equal to the time the record surface moves the distance of one word space between said read and write heads; clock timing means coupled to said record member for producing a plurality of uniform spaced clock pulses during at least the time interval of said cycle pulse; and gating circuit means coupled to said commutator means, cycle timing means and clock timing means to produce switching signals for sequentially switching said transducers.

No references cited.

BERNARD KONICK, *Primary Examiner.*

T. W. FEARS, *Assistant Examiner.*